United States Patent [19]
Eide et al.

[11] Patent Number: 5,314,386
[45] Date of Patent: May 24, 1994

[54] DRIVE DEVICE FOR A ROTATABLE SHAFT

[75] Inventors: Russel L. Eide; Eric P. Eide, both of Mondovi, Wis.

[73] Assignee: Light Work Inc., New Underwood, S. Dak.

[21] Appl. No.: 900,115

[22] Filed: Jun. 18, 1992

[51] Int. Cl.$^5$ ............................................. F16H 7/00
[52] U.S. Cl. ...................................... 474/84; 474/150
[58] Field of Search ................... 474/84, 85, 88, 148, 474/150; 241/154, 285.1, 189.1, 189.2, 253

[56] References Cited

U.S. PATENT DOCUMENTS

| | | | |
|---|---|---|---|
| 2,428,142 | 4/1947 | Carter | 474/150 X |
| 2,775,131 | 12/1956 | Smits | 474/84 X |
| 3,085,756 | 4/1963 | Danforth et al. | 241/253 X |
| 3,534,634 | 10/1970 | Kawanami | 474/150 X |
| 4,119,055 | 10/1978 | Ward et al. | 116/74 |
| 4,477,028 | 10/1984 | Hughes | 241/253 X |
| 4,949,915 | 8/1990 | Hughes | 241/253 X |

*Primary Examiner*—Ramon S. Britts
*Assistant Examiner*—Roger J. Schoeppel
*Attorney, Agent, or Firm*—Wicks, Nemer & Kamrath Peterson

[57] ABSTRACT

A drive device (140) for the rotatable shaft (44) of a mill (10) is disclosed including first and second, diametrically opposed carriers (142). In each of the carriers (142), the ends of first and second bearing plates (152, 154) and of a motor plate (176) extend through parallel slots (148-150) formed in parallel, first and second housing plates (144) and are secured to adjustment plates (164) located outside of and slideable on the housing plates (144). Screw mechanisms (168) extend between and adjustably relate the housing and adjustment plates (144, 164) to provide relative sliding therebetween. A jack shaft (156) rotatably mounted by first and second bearings (158, 160) carried by the bearing plates (152, 154) includes a sheave (162) located intermediate the bearing plates (152, 154). A motor (180) is mounted to the motor plate (176) and has an output shaft (182) coupled to an end of the jack shaft (156) to avoid overhung loads to the motor (180). The rotatable shaft (44) is rotatably related to the jack shaft (156) by belts (198, 202) extending around sheaves (162, 196, 200) on the jack shaft (156) and the rotatable shaft (44) in diametrically opposite directions to avoid overhung loads being transferred to the rotatable shaft (44).

20 Claims, 3 Drawing Sheets

DRIVE DEVICE FOR A ROTATABLE SHAFT

BACKGROUND

The present invention generally relates to drive devices, and particularly to drive devices for rotatable shafts.

In various apparatus such as mills for processing, resizing, and grinding various materials, a rotatable shaft must be driven by a motive force such as by a motor (electric or hydraulic), an internal combustion engine, or the like. Problems then arise in the mounting, adjustment, and alignment of the motive force to the apparatus and with respect to the rotatable shaft. These problems are further complicated when the output shaft of the motive force is not parallel to the rotatable shaft and/or is rotated at speeds different than the desired rotational speeds of the rotatable shaft. Additionally, problems encountered also include overhung loads caused by tensions and pull on the rotatable shaft which accelerate bearing wear, difficulties in manufacture, maintenance, and compatibility with different types and forms of motive forces, placement restrictions which physically limit the form of the apparatus and create other liabilities, and the like. Also, if a single drive train is utilized in apparatus requiring high levels of torque to the rotatable shaft such as mills for processing, resizing, and grinding various materials, the motive forces as well as the other components in the drive train are required to be of large sizes which often are non-stock items having costs which are a multiple of smaller sizes.

SUMMARY

The present invention solves these problems and other needs in the field of drive devices for rotatable shafts by providing, in the preferred form, first and second carriers each of which rotatably mount a sheave or similar rotatably relating means on a jack shaft between first and second bearings which mount the jack shaft, with the jack shaft of the first carrier being rotated by a motor or similar means and located diametrically opposite the rotatable shaft than the jack shaft of the second carrier.

In other aspects of the present invention, the carriers each include first and second bearing plates adjustably mounted for simultaneous movement between first and second housing plates, with the jack shaft being rotatably mounted between the first and second bearing plates.

It is thus an object of the present invention to provide a novel drive device for rotatable shafts.

It is further an object of the present invention to provide such a novel drive device which avoids overhung loads on the rotatable shaft.

It is further an object of the present invention to provide such a novel drive device allowing the use of two sets of smaller drive components which combine to provide the torque levels for the rotatable shaft and which are more readily available and tend to be less costly.

It is further an object of the present invention to provide such a novel drive device providing ease of adjustment and alignment.

It is further an object of the present invention to provide such a novel drive device which can act as the base for the apparatus including the rotatable shaft.

It is further an object of the present invention to provide such a novel drive device which avoids transfer of overhung loads to the motor or other motive force.

It is further an object of the present invention to provide such a novel drive device allowing ease of maintenance including changing the drive components while minimizing the disassembly of the carrier.

It is further an object of the present invention to provide such a novel drive device allowing ease of manufacture and field transition between different types and/or sizes of motive forces.

It is further an object of the present invention to provide such a novel drive device where the motor or other motive force is not supported by the apparatus including the rotatable shaft.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

Figure 1:
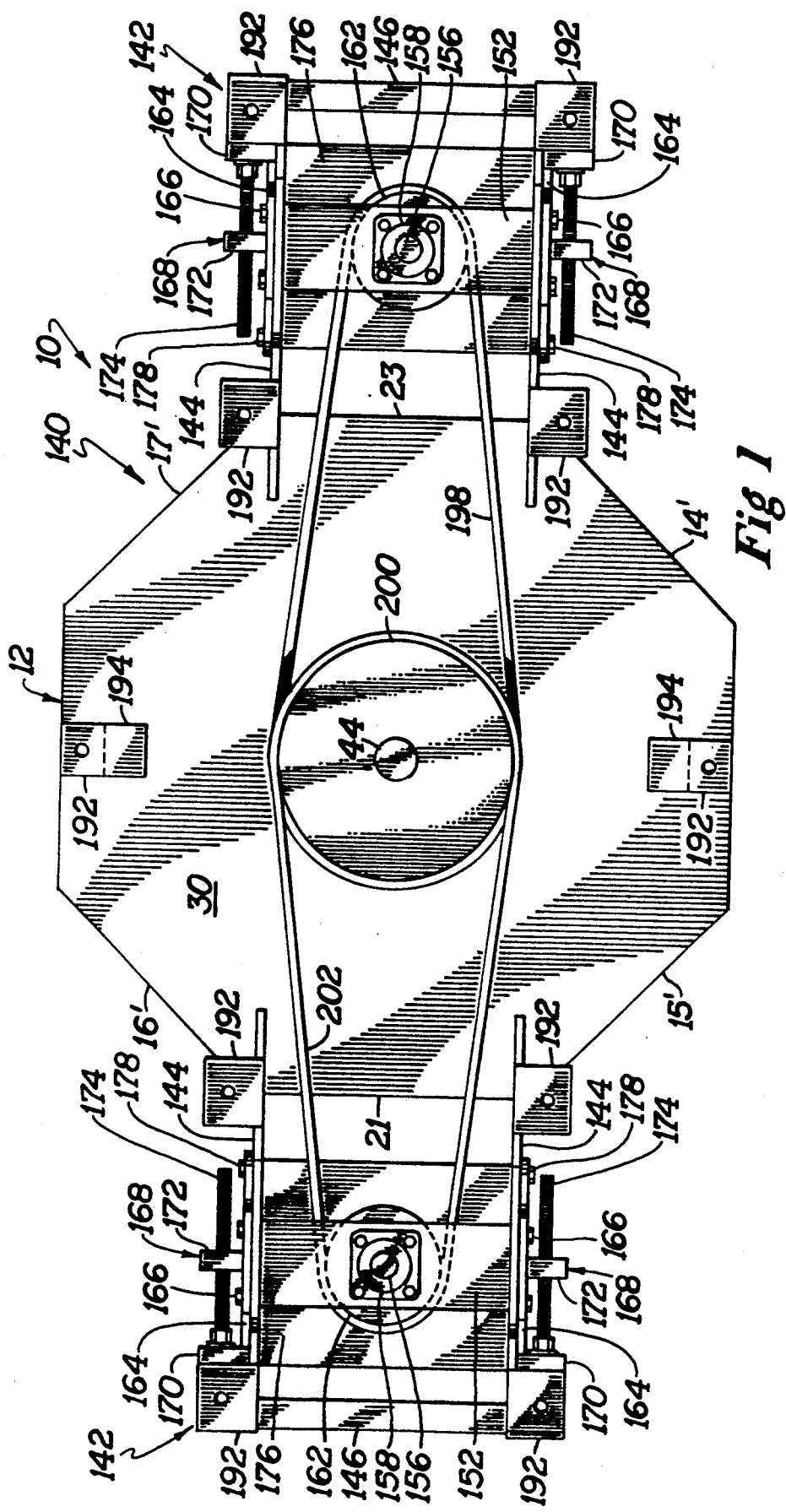
FIG. 1 shows a bottom plan view of a mill including a drive device for the rotatable shaft of the mill according to the preferred teachings of the present invention, with portions being broken away to expose the constructional details thereof.
Figure 2:
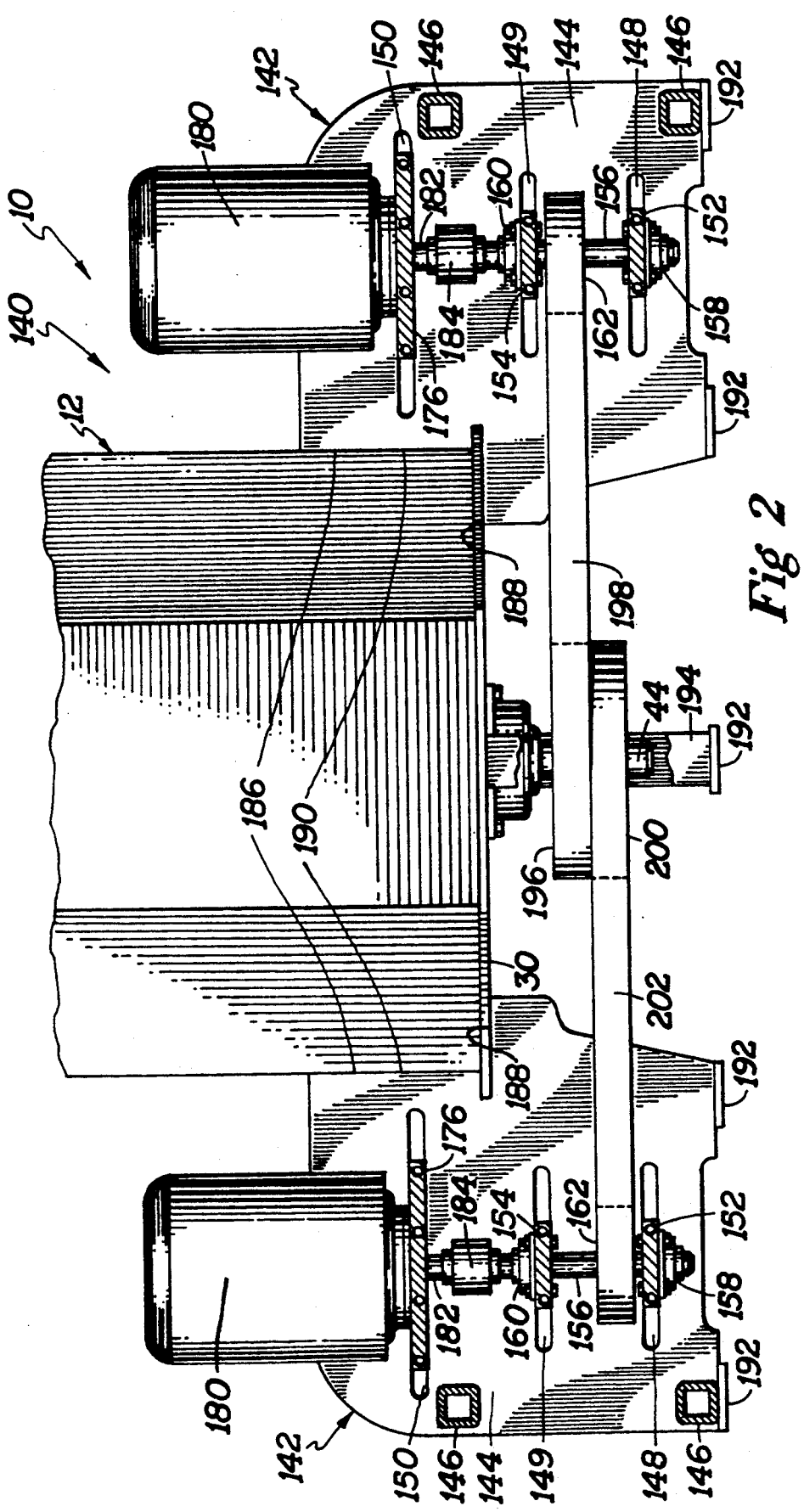
FIG. 2 is a side view of the drive device of FIG. 1, with portions being broken away to expose the constructional details thereof.
Figure 3:
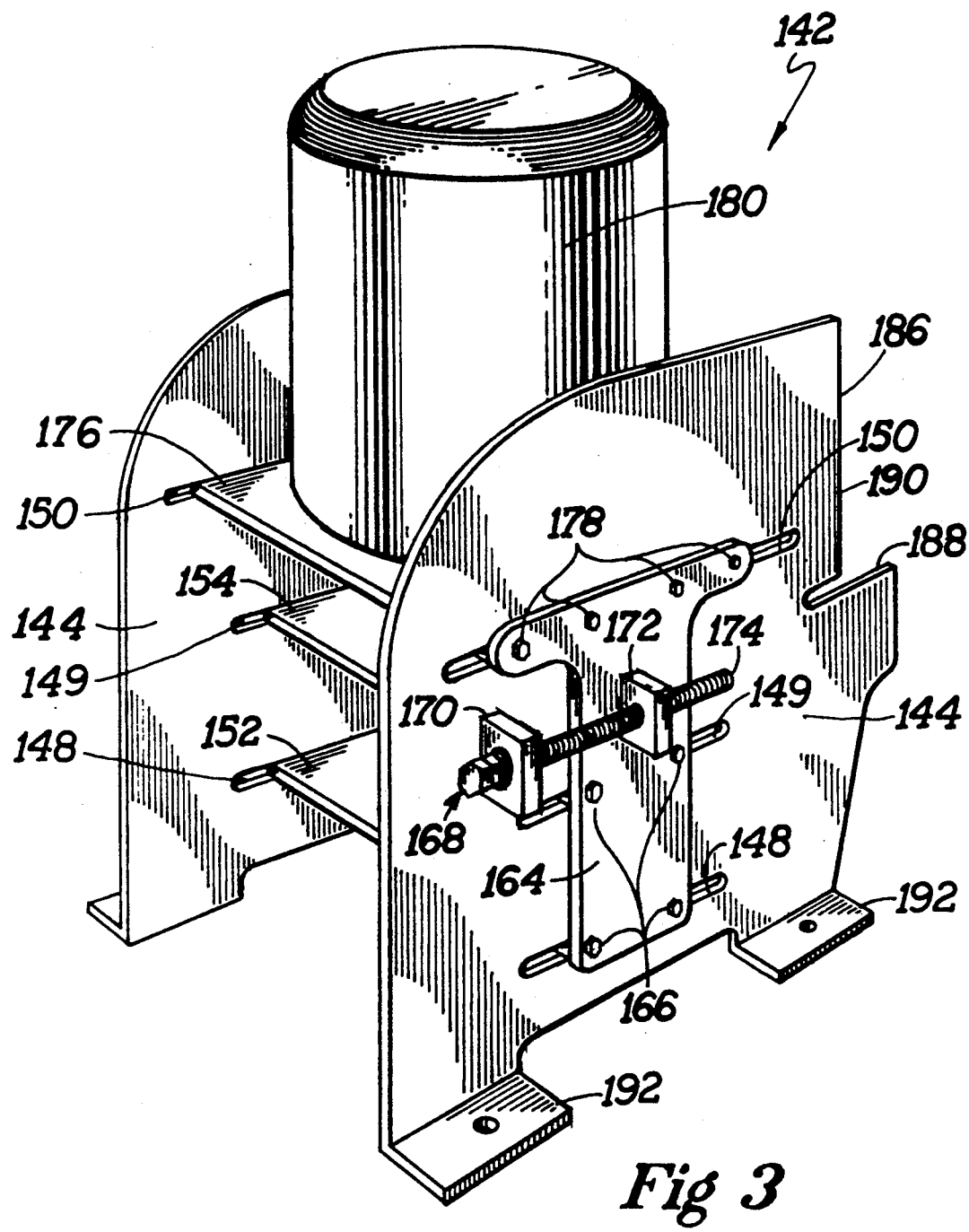
FIG. 3 is a perspective view of the drive device of FIG. 1.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "top", "bottom", "first", "second", "length", "width", "end", "side", "horizontal", "vertical", and similar terms are used herein, it should be understood that these terms have reference only to the structure shown in the drawings as it would appear to a person viewing the drawings and are utilized only to facilitate describing the invention.

DESCRIPTION

A drive device according to the preferred teachings of the present invention which can be utilized for rotating the shaft 44 of a mill 10 is generally shown in the drawings and designated 140. In the most preferred embodiment of the present invention, mill 10 is of the type shown and described in U.S. Pat. Nos. 4,989,796; 5,067,661; and 5,205,500. For purpose of explanation of the basic teachings of the present invention, the same numerals designate the same or similar parts in the present Figures and the Figures of U.S. Pat. Nos. 4,989,796; 5,067,661; and 5,205,500. The description of the common numerals and mill 10 may be found herein and in U.S. Pat. Nos. 4,989,796; 5,067,661; and 5,205,500, which are hereby incorporated herein by reference.

Referring to the drawings in detail, device 140 generally includes first and second carriers 142 which are arranged diametrically on opposite sides of mill 10 Specifically, each of the carriers 142 include first and second housing plates 144 held in a spaced apart, parallel relation such as by spacers 146. Each of the plates 144 includes first, second, and third, parallel, spaced slots 148, 149, and 150, with slots 148 and 149 being of the same length and less than the length of slot 150. Carriers 142 further include first and second bearing plates 152 and 154 having a length generally equal to the spacing between the outside surfaces of first and second housing plates 144 and of a size allowing for the slideable receipt of their ends in slots 148 and 149. As shown in the drawings, plate 152 is slideable in slots 148 of first and second plates 144, and plate 154 is slideable in slots 149 of first and second plates 144. A jack shaft 156 is rotatably mounted by and between bearings 158 and 160 fixed to plates 152 and 154, respectively, spaced between and parallel to first and second plates 144. A sheave 162 is rotatably fixed to jack shaft 156 and located between plates 152 and 154.

Carriers 142 further include first and second adjustment plates 164 located outside of and parallel to housing plates 144. Plates 152 and 154 extend between and are removably secured to first and second plates 164 such as by bolts 166 which extend through plates 164 and are threadably received in the ends of plates 152 and 154. A screw mechanism 168 extends between and adjustably relates plates 144 and 164 on each side of carrier 142 to provide relative sliding therebetween. Specifically, tabs 170 and 172 extend from plates 144 and 164, respectively, and a threaded screw 174 extends therebetween. By threading screw 174 in a first direction, plates 164 (and plates 152 and 154 and jack shaft 156) will slide relative to plates 144 away from mill 10 and by threading screw 174 in the opposite direction, plates 164 (and plates 152 and 154 and jack shaft 156) will slide relative to plates 144 toward mill 10. It should be realized that screw mechanisms 168 on the opposite sides of each carrier 142 are independently adjustable.

Carriers 142 in the most preferred form each further include a motor plate 176 having a length generally equal to the spacing between the outside surfaces of first and second housing plates 144 and of a size allowing for the slideable receipt of its ends in slots 150. Plate 176 extends between and is removably secured to first and second plates 164 such as by bolts 178 which extend through plates 164 and are threadably received in the ends of plate 176. It can then be appreciated that plate 176 and any components mounted thereon will move as a unit with plates 152, 154, and 164 with adjustment of screw mechanisms 168. Motor plate 176 includes suitable provisions for mounting a motor 180 of any suitable type such as electrically or hydraulically actuated. For example, plate 176 could include provisions for fixing a C-face motor 180. The output shaft 182 of motor 180 can be rotatably related to an end of jack shaft 156 such as with a suitable coupler 184 so that motor 180 rotates jack shaft 156 and sheave 162 secured thereto in bearings 158 and 160.

It can then be appreciated that plates 152, 154, and 176 are adjustably mounted for simultaneous movement between housing plates 144 in a spaced apart manner by their ends being slideably received in slots 148–150, respectively, which prevent movement in a vertical direction, by their securement to adjustment plates 164 which slide upon and abut with the outside surfaces of plates 144 which prevent movement in a horizontal direction into or out of slots 148–150, and by screw mechanisms 168 which prevent undesired movement in a horizontal direction parallel to slots 148–150 and toward or away from shaft 44 of mill 10, with screw mechanisms 168 allowing threadable adjustment of plates 152, 154, 164, and 176 relative to plates 144.

Each of plates 144 include a notch 186 formed in an inside corner thereof and specifically includes a horizontal surface 188 for abutting and securement (such as by welding) to a horizontal wall of mill 10 and a vertical surface 190 for abutting and securement (such as by welding) to a vertical wall of mill 10. In the most preferred form, carriers 142 form the base for mill 10 with surface 188 abutting bottom plate 30 and surface 190 abutting with one of the side plates of mill 10. In the most preferred form, plates 144 are spaced generally equal to the width of one of the side plates of the octagonally shaped mill 10, with plates 144 extending perpendicularly from the edges of one of the side plates 21 and 23 of mill 10 at its interconnection with the adjacent side plates 15' and 16' and 14' and 17', respectively, with plates 144 of first and second carriers 142 extending from side plates 21 and 23 of mill 10 which are diametrically opposite and parallel to each other. In the most preferred form where carriers 142 form the base for mill 10, foot pads 192 can be secured generally perpendicularly to the bottom edges of plates 144 for weight distribution. Additionally, mill 10 can include legs 194 located on diametrically opposite sides of mill 10 and quadrantly spaced from first and second carriers 142.

Shaft 44 of mill 10 extends below plate 30 and includes a first sheave 196 driven by sheave 162 of first carrier 142 by means of belts 198 or the like to rotatably relate shaft 44 to jack shaft 156. Additionally, shaft 44 of mill 10 includes a second sheave 200 located below plate 30 and sheave 196 and driven by sheave 162 of second carrier 142 by means of belts 202 to rotatably relate shaft 44 to jack shaft 156. It should then be appreciated that the tension of belts 198 and 202 can be independently adjusted by means of screw mechanisms 168 of carriers 142 without the use of idler pulleys. Specifically, by threading screws 174 of screw mechanisms 168, jack shafts 156 and sheaves 162 mounted thereon move away from or toward mill 10 and thus increasing or decreasing the spacing from shaft 44 and sheaves 196 and 200 mounted thereon.

Now that the basic construction of drive device 140 according to the preferred teachings of the present invention has been explained, some of the advantages of device 140 can be set forth and appreciated. It should be noted that since carriers 142 in the most preferred form are arranged diametrically opposite, overhung load on shaft 44 and its bearings of mill 10 which would be caused by belt tension and belt pull if shaft 44 was loaded only from a single side (or non diametrically loaded) is avoided. Thus, the life of the bearings for shaft 44 are extended. Similarly, as motor 180 is simply coupled to jack shaft 156, the overhung load caused by the tension and pull of belts 198 or 202 to jack shafts 156 is transferred to plates 144, 152, 154 and 164 through bearings 158 and 160 and specifically is not transferred to output shaft 182 of motor 180 through coupler 184. Thus, motor 180 is not subjected to an overhung load increasing the life of the bearings for shaft 182 and of motor 180.

Carriers 142 according to the preferred teachings of the present invention allow changing of belts 198 and 202 while minimizing the dissassembly required. Specifically, after loosening belts 198 and/or 202 by utilizing screw mechanisms 168 and after removing bolts 166 from the ends of bearing plate 152, bearing plate 152 can be pivoted about jack shaft 156 on bearings 158 to extend generally parallel to and spaced between plates 144. In this position, belts 198 and/or 202 can be looped around plate 152, shaft 156, and sheave 162. Thereafter, plate 152 can be pivoted about jack shaft 156 on bearing 158 to extend generally perpendicularly between plates 164 and bolts 166 threaded into the ends thereof. After belts 198 and/or 202 have been placed upon their respective sheaves 196 and/or 200 of shaft 44, plates 152, 154, and 164 and jack shaft 156 can be slid by screw mechanisms 168 relative to plates 144 away from mill 10 until belts 198 and/or 202 are under the desired tension.

Carriers 142 according to the teachings of the present invention are also advantageous for ease of manufacture and field transition between different types and/or sizes of motors 180. For example, to switch between an electrically or a hydraulically actuated motor 180, it is only necessary to change plate 176 and possibly also coupler 184, which can be accomplished without disassemblying plates 152 and 154 from plates 164. Thus, minimal number of parts are required in inventory for different types and/or sizes of motors 180 and transition can be easily accomplished during manufacture or at the field.

In the most preferred form, drive device 140 according to the teachings of the present invention allows the use of two sets of smaller more readily available drive components including motors 180, shafts 156, bearings 158 and 160, sheaves 162, belts 196 and 200, and the like to drive mill 10 instead of one larger set of drive components. In most cases, the cost for two smaller motors 180 will be less than a single, larger motor 180 providing the same amount of power. Similarly, the other drive components result in similar cost savings in two smaller components are replaced with a larger single component of compare size.

Drive device 140 according to the teachings of the present invention comprising the base of mill 10 or similar apparatus having a shaft 44 desired to be driven arrives at several advantages. For example, the weight of motors 180 is supported by carriers 142 and specifically is not required to be supported by housing 12 of mill 10. Additionally, user friendly maintenance is facilitated in that the drive components including motors 180 are at ground level and are generally unobstructed. In this regard, bottom plate 30 of mill 10 in the most preferred form is 23 inches (58 cm) above the support surface to enable an average size person to comfortably lie on the support surface and underneath plate 30 of mill 10 for any maintenance or repairs. Similarly, a larger input opening is allowed than if the drive were located at the top of mill 10. Additionally, if the drive were located on the top of mill 10, maintenance personnel must climb on top of mill 10 to maintain motor 180 and other drive components which typically would require that a ladder and railing be included on mill 10 and would otherwise increase product liability. In the most preferred form, the top and bottom bearings of mill 10 are remotely greased so that no regular maintenance is required to be done on top of mill 10.

It can then be appreciated that drive device 140 is particularly useful for drive shaft 44 of mill 10 for processing, resizing, or grinding various materials. However, the teachings of the present invention may be applicable to other environments where a rotatable shaft 44 is desired to be driven and like advantages are desired.

Now that the basic teachings of the present invention have been explained, many extensions and variations will be obvious to one skilled in the art. For example, in the most preferred form, although diametrically opposed, first and second carriers 142 are utilized to avoid overhung loads, carriers 142 can be utilized singly to obtain the many advantages thereof when overhung loads are not a concern.

Likewise, although twin motive forces are utilized to allow the use of smaller, more readily available, and less costly drive components, the teachings of the present invention can be utilized to avoid overhung loads but utilizing only a singly motive force.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Device for driving a rotatable shaft of an apparatus comprising at least a first carrier comprising, in combination: first and second housing plates held in a spaced apart relation; first and second bearing plates; means for adjustably mounting each of the first and second bearing plates between the first and second housing plates, with the adjustably mounting means simultaneously moving the first and second bearing plates relative to the housing plates and in a spaced apart relation; a jack shaft rotatably mounted between the first and second bearing plates; means for rotatably relating the rotatable shaft of the apparatus with the jack shaft; and means for rotating the jack shaft.

2. The drive device o claim 1 wherein the rotating means comprises, in combination: a motor plate, with the adjustably mounting means mounting the motor plate between the first and second housing plates and for simultaneous movement with the first and second bearing plates; a motor carried by the motor plate, with the motor having an output shaft; and means for rotatably relating the output shaft of the motor to the jack shaft.

3. The drive device of claim 2 wherein the adjustably mounting means comprises, in combination: first and second adjustment plates, with the bearing and motor plates extending between and secured to the first and second adjustment plates; and means for slideably mounting the first and second adjustment plates relative to the first and second housing plates.

4. The drive device of claim 3 wherein the slideably mounting means comprises slots formed in the first and second housing plates for slideably receiving the bearing and motor plates, with the first and second adjustment plates located outside the first and second housing plates.

5. The drive device of claim 4 wherein the adjustably mounting means further comprises, in combination: a screw mechanism extending between and threadably adjustably relating the housing plates and the adjustment plates.

6. The drive device of claim 3 wherein the adjustably mounting means further comprises, in combination: a screw mechanism extending between and threadably adjustably relating the housing plates and the adjustment plates.

7. The drive device of claim 1 wherein the adjustably mounting means comprises, in combination: first and second adjustment plates, with the bearing plates extending between and secured to the first and second adjustment plates; and means for slideably mounting the first and second adjustment plates relative to the first and second housing plates.

8. The drive device of claim 7 wherein the slideably mounting means comprises slots formed in the first and second housing plates for slideably receiving the bearing plates, with the first and second adjustment plates located outside the first and second housing plates.

9. The drive device of claim 8 wherein the adjustably mounting means further comprises, in combination: a screw mechanism extending between and threadably adjustably relating the housing plates and the adjustment plates.

10. The drive device of claim 7 wherein the adjustably mounting means further comprises, in combination: a screw mechanism extending between and threadably adjustably relating the housing plates and the adjustment plates.

11. Device for driving a rotatable shaft of an apparatus comprising, in combination: first and second carriers, with each of the carriers including a jack shaft rotatably mounted by first and second bearings about an axis parallel to the rotatable shaft of the apparatus and including means on the jack shaft between the first and second bearings for rotatably relating the jack shaft to the rotatable shaft of the apparatus, with the jack shaft of the first carrier being diametrically opposite the rotatable shaft of the apparatus and the jack shaft of the second carrier; means for rotating the jack shaft of the first carrier; and means for rotating the jack shaft of the second carrier.

12. The drive device of claim 11 wherein each of the carriers include first and second housing plates held in a spaced apart relation; first and second bearing plates; and means for adjustably mounting each of the first and second bearing plates between the first and second housing plates, with the adjustably mounting means simultaneously moving the first and second bearing plates relative to the housing plates and in a spaced apart relation, with the jack shaft rotatably mounted by the first and second bearings between the first and second bearing plates.

13. The drive device of claim 12 wherein each of the carriers include a motor plate, with the adjustably mounting means mounting the motor plate between the first and second housing plates and for simultaneous movement with the first and second bearing plates, with the rotating means carried by the motor plate.

14. The drive device of claim 13 wherein the rotating means comprises, in combination: a motor carried by the motor plate, with the motor having an output shaft; and means for rotatably relating the output shaft of the motor to the jack shaft.

15. The drive device of claim 13 wherein the adjustably mounting means comprises, in combination: first and second adjustment plates, with the bearing and motor plates extending between and secured to the first an second adjustment plates; and means for slideably mounting the first and second adjustment plates relative to the first and second housing plates.

16. Device for driving a rotatable shaft of an apparatus comprising, in combination: first and second carriers, with each of the carriers including first and second housing plates held in a spaced apart relation; first and second bearing plates; and means for adjustably mounting each of the first and second bearing plates between the first and second housing plates, with the adjustably mounting means simultaneously moving the first and second bearing plates relative to the housing plates and in a spaced apart relation; and a jack shaft rotatably mounted by first and second bearings between the first and second bearing plates about an axis parallel to the rotatable shaft of the apparatus and including means on the jack shaft between the first and second bearings for rotatably relating the jack shaft to the rotatable shaft of the apparatus, with the jack shaft of the first carrier being diametrically opposite the rotatable shaft of the apparatus and the jack shaft of the second carrier; and means for rotating the jack shaft of the first carrier.

17. The drive device of claim 16 wherein the adjustably mounting means comprises, in combination: first and second adjustment plates, with the bearing plates extending between and secured to the first and second adjustment plates; and means for slideably mounting the first and second adjustment plates relative to the first and second housing plates.

18. The drive device of claim 17 wherein the slideably mounting means comprises slots formed in the first and second housing plates for slideably receiving the bearing plates, with the first and second adjustment plates located outside the first and second housing plates.

19. The drive device of claim 18 wherein the adjustably mounting means further comprises, in combination: a screw mechanism extending between and threadably adjustably relating the housing plates and the adjustment plates.

20. The drive device of claim 17 wherein the adjustably mounting means further comprises, in combination: a screw mechanism extending between and threadably adjustably relating the housing plates and the adjustment plates.

* * * * *